May 19, 1959  B. CAMETTI ET AL  2,887,062
MOTOR PUMP UNIT
Filed July 1, 1954  9 Sheets-Sheet 1

WITNESSES:
E. A. M?Closkey.
J. E. Bieber

INVENTORS
Benjamin Cametti
and William M. Wepfer.
BY
Arthur T. Stratton
ATTORNEY May 19, 1959  B. CAMETTI ET AL  2,887,062
MOTOR PUMP UNIT
Filed July 1, 1954  9 Sheets-Sheet 3

May 19, 1959  B. CAMETTI ET AL  2,887,062
MOTOR PUMP UNIT

Filed July 1, 1954  9 Sheets-Sheet 5

United States Patent Office  2,887,062
Patented May 19, 1959

2,887,062

MOTOR PUMP UNIT

Benjamin Cametti, Forest Hills, and William M. Wepfer, Bethel Township, Allegheny County, Pa., assignors to Westinghouse Electric Corporation, East Pittsburgh, Pa., a corporation of Pennsylvania Application July 1, 1954, Serial No. 440,826

24 Claims. (Cl. 103—87)

Our invention relates generally to pumps driven by electric motors, and more particularly to such devices which are adapted to be mounted in completely sealed casings.

In such devices the fluid being pumped often is, independent of the pressure produced by the pump, at a high pressure above atmospheric pressure. Under such conditions, it has been proposed to have the motor unit in a sealed casing to which the pumped fluid has access at full system pressure, thus eliminating the need for shaft seals between the motor and pump units, but previous proposed designs have been relatively complicated, and thus difficult to manufacture and maintain.

Other difficulties are encountered when the motor pump unit must be installed in a hermetically sealed pumping system, with substantially zero leakage allowance, especially when pumping corrosive or explosive fluids at elevated temperatures where any leakage becomes dangerous. In such systems, maintenance is difficult, and cooling of the motor presents additional problems, particularly if a unit of simple design is to be achieved which is capable of running at the elevated temperatures encountered.

In order to eliminate these difficulties, we have provided a hermetically sealed motor pump unit free of external high pressure connections, yet having an efficient cooling arrangement, so that the pump can be removed from the pumping system as a unit, and also having the motor rotor and stator hermetically sealed in metal cylinders so that they can be immersed in the pumped fluid at full system pressure. In addition, we have sealed the motor terminals where they emerge from the unit so that if the cylinder sealing the stator should rupture, none of the pumped fluid can escape.

Accordingly, the principal object of our invention is to provide a novel design of hermetically sealed motor pump unit capable of being sealed in a high-pressure, high-temperature pumping system where the pumped fluid has access to the motor but is isolated from the motor windings and containing a unique sealed cooling and lubricating system utilizing the fluid in the motor as the cooling and lubricating means.

Another object of our invention is to provide in a hermetically sealed motor pump unit, as herein described, an improved cooling and lubricating system.

Another object of our invention is to provide in a hermetically sealed motor unit, as herein described, an improved cooling means for the motor stator.

Another object of our invention is to provide in a hermetically sealed motor pump unit a unique thermal barrier for retarding the transfer of heat from the fluid being pumped to the fluid circulated in the internal cooling system.

Another object of our invention is to provide in a hermetically sealed motor pump unit, as herein described, an improved interchangeable bearing arrangement, employing the same fluid being pumped to lubricate all types of bearings.

A further object of our invention is to provide in a hermetically sealed motor unit, as herein described, a new and novel means for encasing the rotor and stator of the motor in thin metal cylinders.

Another object of our invention is to provide in a hermetically sealed motor pump unit, as herein described, a unique construction which seals the unit in pumping systems, yet allows for removal of the motor and pump impeller as a unit therefrom.

Another object of our invention is to provide in a hermetically sealed motor unit, as herein described, a new and simplified motor rotor construction, consisting of a solid rotor with shaft extensions, and rotor windings enclosed in a thin metal cylinder.

Another object of our invention is to provide in a hermetically sealed motor unit, as herein described, unique sealed motor terminal structures, in which a power cable may be attached to an auxiliary terminal so that no force is applied to the motor terminal seal.

Another object of our invention is to provide in a hermetically sealed motor pump unit, as herein described, an original means for leak testing of the unit seal welds while installed in the pumping system.

Further objects and advantages of our invention will be apparent from the following detailed description of preferred illustrative embodiments thereof, taken in connection with the accompanying drawings, in which.

Figure 1:
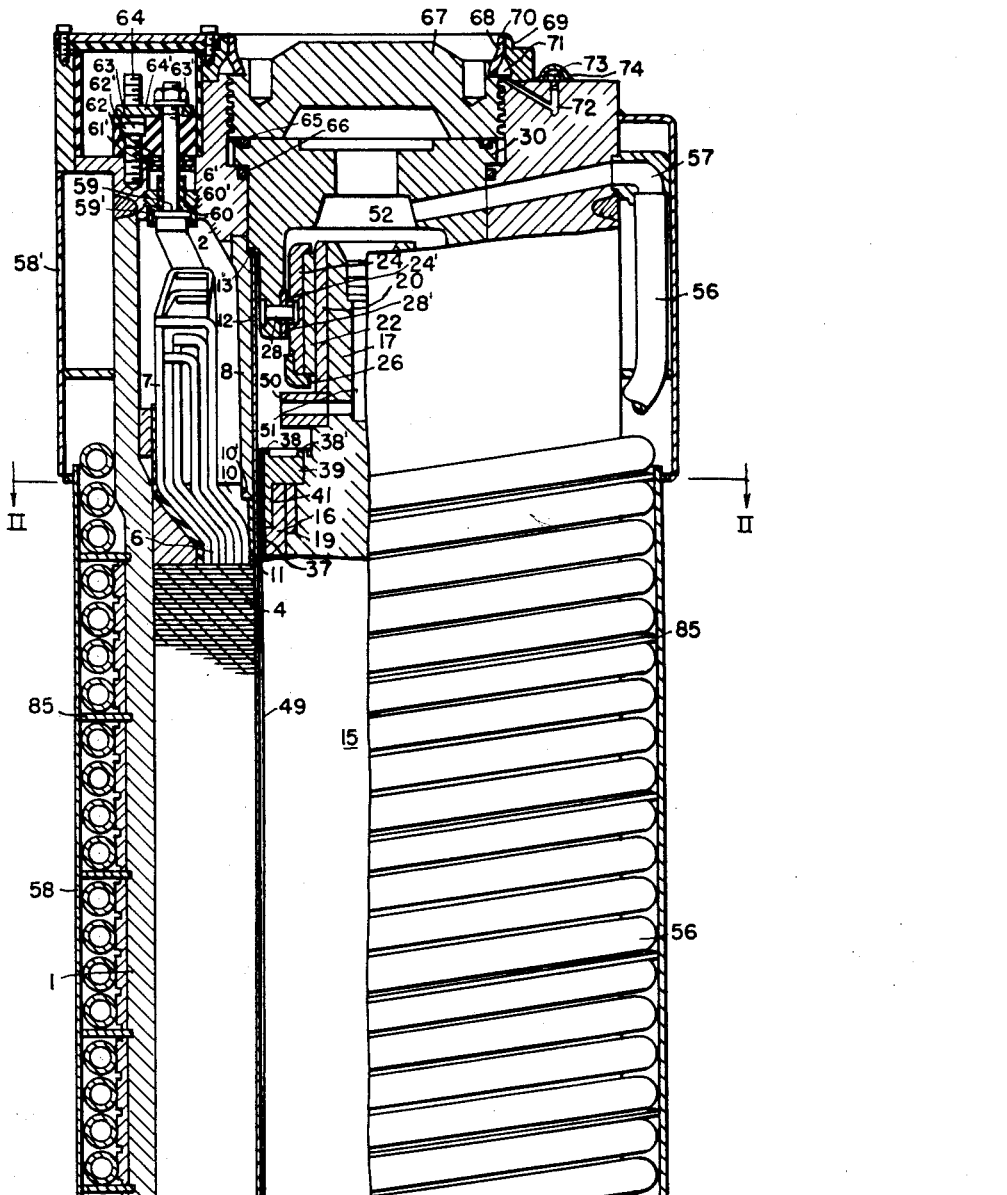
Figure 1 is a partial longitudinal section view of the upper end of a hermetically sealed motor pump unit constructed according to our invention.
Figure 1A:
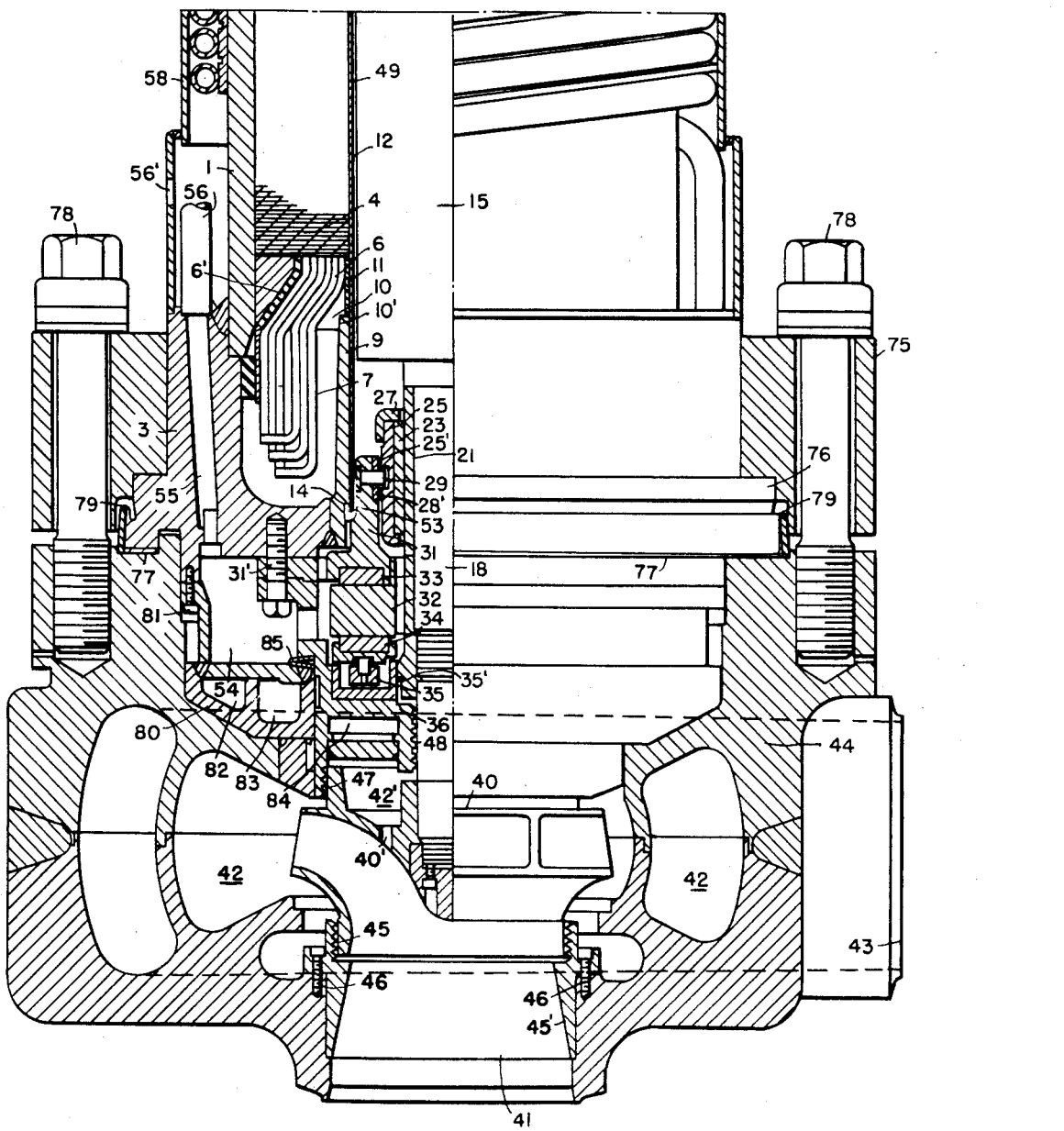
Fig. 1A is a partial longitudinal section view of the lower end of the motor pump unit shown in Fig. 1.

The hermetically sealed motor pump unit shown in Figs. 1 and 1A is designed for operating in a pumping system where the pressure is high, independent of the action of the pump, in relation to atmospheric pressure. Furthermore, as the fluid being pumped can be highly dangerous and as there are no external connections, the pumped fluid is utilized as both a cooling and a lubricating medium.

Figure 2:
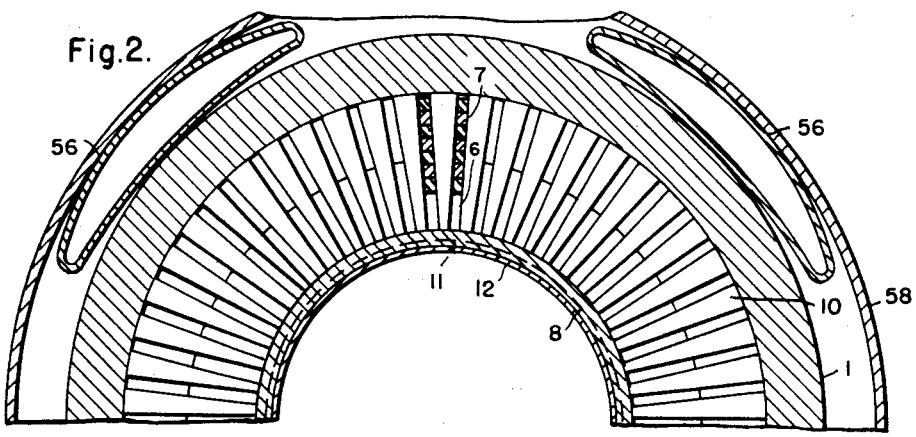
Fig. 2 is a partial transverse sectional view, taken along the line II—II in Fig. 1.

The motor unit has a solid tubular motor frame 1, of a corrosion-resistant material, such as stainless steel, with suitable annular end plates 2 and 3 of the same material welded to opposite ends of the frame, respectively, and each having a circular opening for receiving the rotor of the motor unit. The stator consists of a number of ring-shaped laminations 4, of a suitable magnetic material, such as iron, stacked in the frame 1 and having inwardly opening slots for receiving the stator windings 6. The stator windings 6 terminate in end turns 7 which are enclosed by heavy walled cylinders 8 and 9, at the upper and lower ends of the stator, respectively, preferably of a corrosion resistant material, such as stainless steel. The cylinders 8 and 9 are welded at their outer ends to end plates 2 and 3, respectively. The inner ends of cylinders 8 and 9 are each supported by an annular groove 10' in heavy annular finger plates 10 (Figs. 1, 1A and 2) located at each end of the laminations 4. The finger plates 10 serve to locate the stator laminations 4 in the frame 1, and each contains suitable inwardly opening slots for the stator windings 6 to pass through as they emerge from the stator laminations 4, with insulation 6' interposed between the windings and the slots. Positioned on the inner periphery of the annular finger plates 10 are rings 11, which bridge the gaps in the annular finger plates caused by the slots through which the stator windings pass. The inner surface of the cylinders 8 and 9, rings 11 and the inner surface of the stator laminations 4 thus form a relatively smooth continuous circular rotor opening through the motor unit. A thin walled cylinder 12 preferably of corrosion resisting non-magnetic material, having a high electrical resistance, such as stainless steel, hermetically seals the stator 4 and its winding 6 in the motor frame 1. The cylinder 12 is supported on its outer surface by the aforementioned continuous circular rotor opening, and is welded at each end to thin annular flanges 13 and 14 projecting integrally from the outer ends of cylinders 8 and 9, respectively. The use of thin annular flanges on cylinders 8 and 9 allows the welding of the thin walled cylinder 12 to a similar material of the same thickness which simplifies the welding procedure and insures the hermetic sealing of the stator 4 and its winding 6 in the motor frame 1.

By means of the above-described construction, we have provided a solid tubular motor frame containing a stator which is hermetically sealed in the motor frame by a thin walled cylinder. The cylinder being of corrosion resisting non-magnetic material of high electrical resistance has a negligible effect on the magnetic characteristics of the stator, and by maintaining the cylinder wall thin, the gap between the stator and the rotor is small. In order for the thin cylinder 12 to withstand extremely high pressures without rupturing, we have provided the unique construction mentioned to support it throughout its length.

A generally cylindrical solid rotor 15, preferably of a corrosion resisting magnetic material, such as a chromium stainless steel, having suitable slots on its outer surface for squirrel-cage type windings 16, is rotatably mounted by means of shaft extensions 17 and 18 secured thereto at opposite upper and lower ends, respectively. The squirrel-cage windings 16 are joined at their ends by means of annular rings 19 (only one of which is shown) in engagement with the inner edges of the windings. Bearing journals 20 and 21, preferably of a corrosion resisting material, such as stainless steel, are shrunk on the upper and lower rotor shaft extensions 17 and 18, respectively, to provide a hard bearing journal surface with a smooth finish. The bearing journals 20 and 21 are supported by upper and lower sleeve bearings 22 and 23, respectively, preferably of compressed carbon graphite or compressed ceramic material, the choice depending on the fluid to be pumped. The sleeve bearings 22 and 23 are mounted in flanged cylindrical cartridges 24 and 25, respectively, said cartridges having caps 26 and 27 for retaining the bearing sleeves in the cartridges. The cylindrical cartridges 24 and 25 containing the sleeve bearings 22 and 23 are pivotally mounted by means of spherical protuberances 24' and 25' on the outer surface cartridges 24 and 25, respectively, which seat against the inner surface of hardened ring inserts 28' in bearing housings 30 and 31. Two pairs of pins 28 and 29 are mounted in bearing housings 30 and 31, respectively, and extend into oversize holes in opposite sides of the cartridges 24 and 25, respectively, and serve to retain the cartridges in position while not influencing adversely their self-aligning features. The bearing housing 30 has an outer flange secured against a shoulder on end plate 2, and bearing housing 31 has a flange 31' which is bolted to end plate 3.

The axial thrust of the unit is carried by means of thrust runner 32 which is secured to shaft extension 18, and runs between thrust bearings 33 and 34, which are preferably made from the same material as sleeve bearings 22 and 23. The thrust bearing 33 is a continuous annular ring which may be suitably radially grooved and shaped to form a conventional tapered-land bearing and is mounted in a channel formed in bearing housing 31, while thrust bearing 34, shown in Fig. 1A, is one of a plurality of pivoted pad thrust shoes pivotally mounted on supporting linkage 35 in an annular channeled bearing retainer 35' supported by an annular bearing support 36. Support 36 may be secured to end plate 3 by the same bolts which secure bearing housing 31 to end plate 3. The specific type of journal bearings and thrust bearing illustrated in this motor unit form no part of this invention, but are particularly disclosed and claimed in our copending application entitled Bearings, Serial No. 440,827, filed July 1, 1954, and assigned to the present assignee.

The rotor 15 is hermetically enclosed in a thin walled cylinder 37, similar to the cylinder 12, and it is welded at each end to thin flanges 38 (only one of which is shown) projecting from annular rings 39 also made from non-magnetic corrosion resisting material, such as stainless steel. The rings 39 are positioned at each end of the rotor and each has an annular flange 41 projecting inwardly over the reduced end portions of windings 16 to hold them in place and in engagement with connecting rings 19. Each ring 39 has a second thin flange 38' which is welded to a similar flange on the rotor 15 at its inner surface, thus hermetically sealing the squirrel-cage windings in the rotor. Since the cylinder 37 is non-magnetic and has a high electrical resistance, it has negligible effect on the magnetic characteristics of the rotor, and due to its thin wall it does not appreciably increase the gap between the rotor 15 and the stator, thus the electrical efficiency of the motor unit is substantially maintained. The cylinder 37 is supported throughout its length by the rotor 15 and its windings 16, and at each end by annular rings 39, thus it is capable of withstanding extremely high pressures without rupturing.

The pump includes a rotary impeller 40 of the centrifugal type which is mounted on the lower motor shaft extension 18 in a position overhanging both radial bearing 23 and thrust bearings 33 and 34. The impeller 40 is designed to draw fluid in through an axial suction inlet 41 at its outer end and impel it radially outward through passages formed in the impeller into a volute-shaped cavity 42 in pump casing 44. From cavity 42, the fluid flows out of the discharge opening 43 in the pump casing 44. Fluid in cavity 42 is prevented from flowing back to suction inlet 41 by means of labyrinth type seal comprising a plurality of annular projections 45 formed on guide collar 45' which is mounted in the inlet 41 of the pump casing 44 by means of cap screws 46. The projections 45 closely fit the outer periphery of the suction inlet of impeller 40. A plurality of passages 40' (only one of which is shown) in the impeller 40 are designed to allow suction pressure of the fluid to have access to the opposite side of the impeller 40 to partly compensate for the hydraulic unbalance caused by the single suction inlet of the impeller. At the opposite or upper side of the impeller there is a cavity 42' between the impeller and thrust bearing support 36. The fluid in the cavity 42 is prevented from flowing into cavity 42' by means of a labyrinth seal 47, similar to labyrinth seal 45 described above.

The fluid in cavity 42' is prevented from freely flowing into the motor unit by a labyrinth seal 48 similar to labyrinth seal 47. Labyrinth seal 48 is formed on an extension sleeve portion of bearing support 36 adjacent to shaft extension 18. Fluid can, however, seep by labyrinth seal 48 so as to completely fill the stator opening 49 and the remainder of the rotor cavity in the motor unit at substantially full system pressure. Although the fluid completely fills the rotor cavity, it is isolated from the motor windings by the thin walled cylinders 12 and 37 described above. The labyrinth seal 48, while allowing the fluid in the motor unit to build up to the full system pressure, effectively limits any circulation of the fluid in the cavity 42 with the fluid in the motor unit to that caused by diffusion along said labyrinth seal.

The stator windings are connected at their upper end turns 7 to main terminal studs 59 which extend through openings in end plate 2. Main terminal studs 59 have a square head portion 59' which fits in a cooperating rectangular shaped insulating sleeve 60, preferably of molded insulating material such as a synthetic phenolic. Insulating sleeve 60 is retained in the opening in end plate 2 by means of a threaded gland 60'. Main terminal studs 59 are sealed in the end plate 2 by means of a channeled ring type packing 61', preferably of resilient material such as reinforced temperature resistant rubber. A close fitting washer 62 is used to minimize the possibility of the cup packing 61' extending under pressure. A heavy backup for the terminals 59 is provided by insulating block 62', preferably of a molded insulating material such as a synthetic phenolic, which in turn is secured to end plate 2 by means of cap screws 63. Each main terminal stud 59 is finally secured in end plate 2 by tightening nut 63' which retains the complete assembly in place yet allows the cup packing 61' freedom of movement so that it can seal against internal pressure. Suitable power cables may be connected to auxiliary terminals 64 which in turn are connected to main terminal studs 59 by means of a connecting plate 64', preferably an electrical conducting material such as copper. Plate 64' may be secured to back up block 62' by cap screws (not shown). By this means repeated connecting of the power cables is done only on the auxiliary terminals 64 which can be easily replaced, instead of on main terminal studs 59 which can only be replaced with great difficulty and expense.

A central opening in the upper journal bearing support member 30 is provided for inserting a lifting eye bolt into a threaded portion of rotor shaft extension 17 to facilitate withdrawal of the rotor from the motor.

The central opening in motor end plate 2 is sealed by means of a threaded cap 67 which is screwed into motor end plate 2 and two O rings 66 and 65, preferably of a resilient material, such as rubber. O rings 66 and 65 fit into cooperating recesses in end plate 2 and bearing housing 30, respectively, to be engaged by bearing support 30 and cap 67, respectively. Cap 67 retains bearing support member 30 in a rigid position by engagement with a projecting flange on bearing housing 30, which seats the latter on a shoulder on motor end plate 2. Two small annular converging flanges 68 and 69 are secured to and project from the cap 67 and motor end plate 2, respectively, and are welded together at the outer ends with a small seal weld 70, thus effecting a hermetical seal between the motor end plate 2 and the cap 67. Seal weld 70 is more particularly described and claimed in the pending application of Edward J. Kreh, Jr., and Conrad M. Lord, Serial No. 392,692, filed November 17, 1953, now Patent No. 2,805,789 and also assigned to the assignee of our application. The motor unit may still be disassembled by breaking the small seal weld 70 and removing the cap 67. The seal weld 70 can be checked for leakage by introducing helium or other gas under pressure into the ring-like area 71 by means of a passageway 72 formed in end plate 2, then checking for leakage of gas by means of a mass-spectrometer type leak detector or the like. The gas will be prevented from leaking into the remainder of the unit by O rings 65 and 66 previously described above. After seal weld 70 has been checked for leakage, the passageway 72 is sealed by means of threaded plug 73 and a cap 74 which is welded in place.

Since the pump casing may previously have been permanently installed in the pumping system, the motor unit, including the bearings and pump impeller, is attached as a unit to the pump casing 44 by means of annular clamping ring 75 which cooperates with a flange 76 projecting from the motor end plate 3. In drawing the motor-pump unit into a pressure-tight seal with the pump casing 44, a gasket 77, preferably of a ductile material, such as copper, is installed between the outer end of flange 76 and the pump casing 44 in order to seal the motor unit to the pump casing. Bolts 78 extending through the clamping ring 75 and threading into pump casing 44 force the gasket 77 into a pressure-tight seal with the pump casing 44. The motor-pump unit is additionally hermetically sealed to the pump casing 44 by means of a seal weld 79, which is similar in construction to the seal weld 70 previously described for closing the opening in motor end plate 2. Seal weld 79 can be checked for leakage by the same method described for the seal weld 70. The circular opening in the top of pump casing 44 is of a greater diameter than the impeller 40 so that the motor unit with both the impeller 40 together with elements comprising an attached thermal barrier, hereinafter described, can be inserted or withdrawn without disturbing the pump casing 44.

By means of the above construction, we have provided a hermetically sealed motor-pump unit where the pump casing can be permanently installed in the pumping system piping yet allowing removal of the motor unit containing the bearings and pump impeller from the system for servicing. This is advantageous where the unit is used to pump dangerous fluids, because servicing of the unit can be performed in an area removed from the pumping system. The seal weld 79 can be readily made when the motor unit is installed on the pump casing because it is not a structural weld that must withstand stresses but only a protective seal to prevent any leakage from the system in case the gasket 77 should fail.

In checking seal welds 70 and 79 for leakage, we have provided a unique method for checking the motor pump unit for leakage which can be done after it is installed in the system without operating the motor pump unit and subjecting the complete system to pressure. Obviously, subjecting the complete system to fluid pressure would involve considerable risk if the fluid being pumped is dangerous and if a leak is present. All other elements of the motor pump unit except the seal welds 70 and 79 are fabricated during the manufacture of the unit and thus can be tested individually for leakage at many times the designed pressure. Thus, the only avenue for leakage of the fluid from the unit is through the seal welds 70 and 79. The use of O rings 65 and 66 adjacent to the cap 67, and the gasket 77, effectively seal the opening in the upper motor end, and the joint between the motor unit and pump casing, respectively. Thus when gas is introduced into the area enclosed by the seal weld it will not pass into the pumping system but will be contained in the seal weld, thereby allowing a test of the seal weld for leakage by use of a mass spectrometer or other type of leak detector.

A novel thermal barrier is provided to inhibit the passage of heat from the fluid in pump casing 44 to the fluid contained in the stator opening 49 and the remainder of the motor unit. The thermal barrier is comprised of a composite annular flanged member 80, which is attached to motor end cap 3 by means of cap screws 81 extending through its flange. Member 80 contains sealed cavities 82 and 83. The dead air space contained within sealed cavities 82 and 83 effectively inhibits the flow of heat from pump casing 44 to the fluid in cavity 54 of the motor unit, but if it is desired to increase the effectiveness of the thermal barrier, spaces 82 and 83 may be filled with any well-known heat insulating material, such as glass wool or the like. Another sealed cavity 84 is formed in the bearing support 36 to further inhibit the transfer of heat from pump casing 44 to the motor unit. An annular spring 85 which is V-shaped in section is used to seal any opening between bearing support 36 and the flanged member 80, thus preventing the fluid in pump casing 44 from circulating past the labrynth seal 48 through the thrust bearings 33 and 35 and back into the pump casing 44 by means of the opening between members 36 and 80. If circulation between the fluid in pump casing 44 and the fluid in the annular space 54 was possible, the temperature of the fluid would be equalized and the fluid in the motor unit would not be as effective as a cooling medium for the motor unit.

The cooling system of the unit utilizes the fluid contained in the motor unit as a cooling and lubricating medium, and this fluid is circulated throughout the system by means of the auxiliary impeller 50 which is pressed on the shaft extension 17 ahead of the bearing journal 20. The auxiliary impeller 50 draws the fluid through axial passage 51 in shaft extension 17 and impels it radially outward through radial passages in the shaft and impeller 50, and then the major portion flows through the air gap between the rotor 15 and the stator 4. The remainder flows upward past bearing 22, thus lubricating and cooling bearing 22, into cavity 52 and returns by way of passage 51 to the suction side of the auxiliary impeller 50. After the major portion of the fluid flows through the air gap, part of the fluid flows through an annular space between bearing support member 31 and thin walled cylinder 12 (Fig. 1A) then through passage 53 in member 31 and into the cavity 54, the remainder flowing past journal bearing 23, then past the thrust bearings 33 and 34 by means of axial holes in thrust runner 32, and into cavity 54, thereby lubricating and cooling journal bearing 23, and thrust bearings 33 and 34. From cavity 54, the fluid flows in the opposite direction through a plurality of circumferentially spaced passageways 55 through end plate 3 into a corresponding number of coiled tubes 56 which are helically coiled in parallel relation about the motor frame 1, and then the fluid returns to the cavity 52 by means of passageways 57 in the motor end plate 2 and bearing support member 30. The coiled tubes 56 are in intimate contact with the motor frame 1, so that heat generated in the stator laminations 4, which are in intimate contact with the inner surface of the motor frame on their outer periphery, and with cylinder 12 on their inner peripheries, can flow directly through a solid metal path to the cooling fluid circulated through the motor gap and the coiled tubes. This greatly increases the heat transfer rate from the stator 4 over that possible if the motor frame 1 was cooled by circulating air on its outer periphery only. In addition, the entire cooling system is a sealed part of the motor unit, and no external connections are necessary when the motor pump unit is installed.

A composite tubular outer casing 58 surrounds the coiled tubes 56 and is welded at its ends to motor end plates 2 and 3, respectively, thus allowing an external cooling medium to be introduced through an upper opening 58' and circulated in the annular space between the motor frame 1 and the outer casing 58, and discharged through a lower opening 56' (Fig. 1A) thus cooling the fluid circulating in coiled tubes 56 in those cases where the fluid being pumped is at an elevated temperature. The coiled tubes 56 being in intimate contact with motor frame 1 and outer casing 58, form a natural spiral path for this external cooling medium, which path greatly accelerates the transfer of heat to the external cooling medium from the cooling medium circulating in the coil tubes 56. The spiral path for the external cooling medium may be more definitely established by a spirally coiled strip 85 which is interspaced between every fourth coil and is in intimate contact with both the motor frame 1 and the outer casing 58.

Figure 3A:
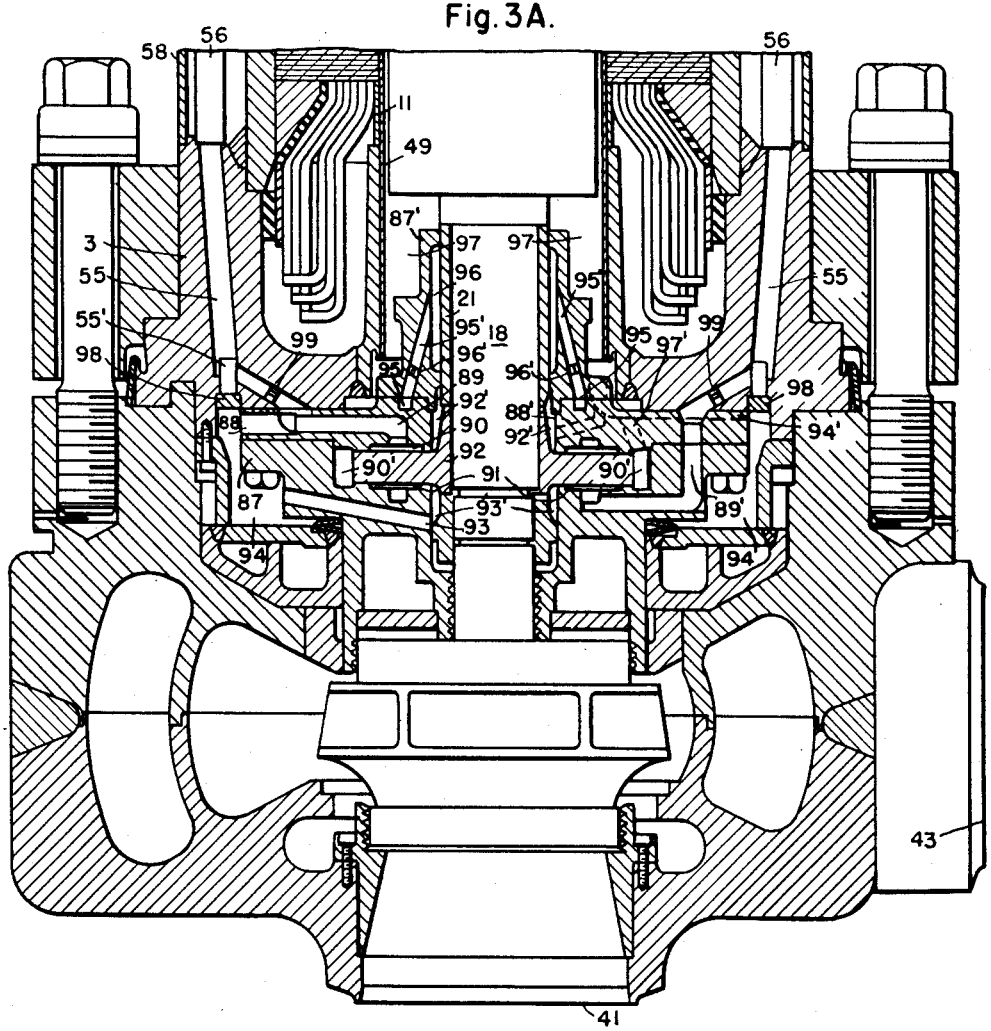
Fig. 3A is a partial longitudinal section of the lower end of the hermetically sealed motor pump unit of Fig. 1A but showing a hydraulic pressurized thrust and radial bearing installed in place of the bearing structure of Fig. 1A.
Figure 3:
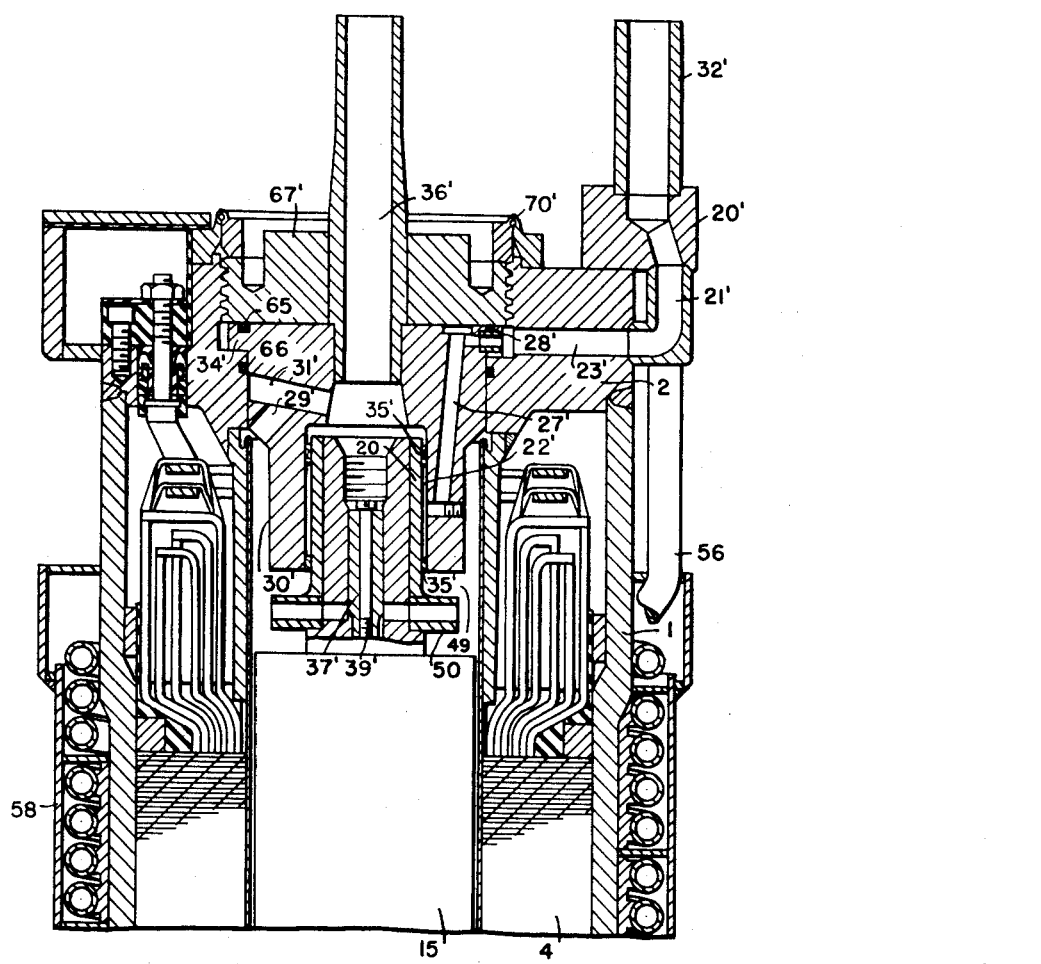
Fig. 3 is a partial longitudinal section of the upper end of the hermetically sealed motor pump unit of Fig. 1, but showing a hydraulic pressurized radial bearing installed in place of the bearing structure of Fig. 1.

Figs. 3 and 3A show the installation of hydraulically pressurized bearings in place of the journal bearings and thrust bearing installed in the motor pump unit illustrated in Figs. 1 and 1A. In replacing the upper journal bearing shown in Fig. 1 with a pressurized bearing, journal bearing 20 and bearing support 30 are removed and a tubular shaped pressurized bearing 30' is substituted. Bearing 30' is held in position by means of a projecting flange 34' thereon, and a modified end cap 67' which clamps flange 34' on the same shoulder on end plate 2 as is used to hold bearing support 30 in position. End cap 67' is threaded into end plate 2, and two O rings 65 and 66 effect a pressure tight seal between cap 67' and end plate 2. A seal weld 70' is provided for hermetically sealing the unit.

A manifold 20' is attached by any suitable means, such as bolting, to end plate 2 and serves to divide the flow of pressurized fluid supplied from an external pressurizing source by means of conduit 32' into a plurality of conduits 21' (one of which is shown). Each conduit 21' has an elbow shape and supplies the pressurized fluid to passages 23' and 27' in the end cap 2 and bearing 30', respectively. The plane of the section shown in Fig. 3 is rotated from the plane of the section shown in Fig. 1, thus passage 23' in end cap 2 does not appear in Fig. 1, and when conventional journal bearings are installed, passage 23' is rendered inoperative by any suitable means such as a small plug welded in place. Passage 27' supplies the pressurized fluid to a pressure pocket 22' formed on the inner periphery of bearing 30' by means of rings 35' which are attached to bearing 30' by any suitable means, such as welding. A metering orifice 28' is secured in passage 23' to control the amount of fluid supplied to bearing 30'. Thus, the upper bearing journal 20 is supported by a cushion of pressurized fluid. The fluid escapes from the lower end of pressure pocket 22' into the upper end of the stator opening 49 from which it flows by means of passages 29' and 31' into conduit 36' which returns it to the external pressurizing source. The fluid escaping from the other end of pressure pocket 22' flows directly into conduit 36' and returns to the external source. The suction inlet 51 of the auxiliary impeller 50 shown in Fig. 1, is in this embodiment of the invention rendered inoperative by means of a plug 37' held in position by cap screw 39'. The passages 57 shown in end cap 2 of Fig. 1, which connect with the coiled tubes 56 of Fig. 1, are rendered inoperative by any suitable means, such as small plugs welded in position.

Each of the coiled tubes 56 shown in Figs. 1 and 1A are connected to the manifold 20' (not shown in Fig. 3) and serve to conduct pressurized fluid to the lower radial bearing and the thrust bearing of Fig. 3A, to be described later.

Fig. 3A shows the installation of a hydraulically pressurized thrust bearing and radial bearing in the lower end of the motor pump unit illustrated in Fig. 1A. In installing these hydraulically pressurized bearings, bearing housing 31 and bearing support 36 of Fig. 1A are replaced by modified annular bearing support members 87 and 88 which are bolted to the motor end plate 3 utilizing the same tapped holes in motor end plate 3 that were used in attaching members 31 and 36. Member 87' which is formed to provide the pressurized journal bearing is bolted to support member 88 by bolts (not shown). Passages 55 in end plate 3, which are supplied with pressurized fluid from coiled tubes 56, terminate in a rectangular shaped annular area 55' in end plate 3 which acts as a manifold to supply fluid to the various parts of the hydraulically pressurized bearings. The fluid in annular area 55' is prevented from escaping into area 94 by means of a ring member 98 which is secured to end plate 3 by any suitable means such as threads on its outer periphery which thread into matching threads in end plate 3. Support member 88 contains at least one passage 89 connecting with annular area 55' by a drilled passage in end plate 3 for supplying fluid under pressure to annular cavity 90 which is formed in the lower surface of member 88 adjacent to one face of thrust runner 92. A metering orifice 99 in the drilled passage in end plate 3 serves to control the amount of fluid supplied to cavity 90. Another drilled passage in end plate 3 is used to conduct fluid from annular area 55' through a passage 89' in bearing supports 87 and 88 to an annular cavity 91 formed in the surface of member 87 adjacent to the other face of thrust runner 92. The metering orifice 99 also controls the fluid supplied to cavity 91. Thus, thrust runner 92 will float on a hydraulic cushion of fluid supplied to cavities 90 and 91, respectively. As fluid escapes from opposite sides of cavity 90 it flows into annular areas 90' and 92', respectively, from which it flows into the lower end 97 of the stator opening by means of passages 97' and 88', respectively. The fluid in cavity 91 escapes from opposite sides into area 90' at one side from which it flows into area 97 by means of passage 97', and into area 93' at the other side from which it flows to area 94 by means of passage 93. From the annular area 94 surrounding the lower end of the thrust bearing support 87 it flows into the lower end 97 of the stator openings by means of a passage 94' in the top thrust bearing support 88. Also extending from annular area 55' in end plate 3 is a passage (not shown) similar to passages 89 and 89', but containing no orifice, which supplies fluid to a rectangular shaped annular area 95 in member 88. From area 95 multiple passages 95' conduct the fluid to a plurality of pressure pockets 96 formed on the inner periphery of member 87', which surround the radial bearing journal 21. The array of pressurized pockets 96 surrounding the bearing journal 21 on shaft extension 18 thus float the journal 21 on a cushion of pressurized fluid. Each passage 95' contains a metering orifice 96' which controls the flow of fluid to each pressurized pocket 96. The fluid in the pressurized pockets 96 flows into both cavity 97 and cavity 92' from which it flows into cavity 97 by means of passage 88'. The fluid in cavity 97 flows into the stator opening 49 where it cools the rotor 15 and the stator and out through passages 29' and 31', respectively (Fig. 3) into passage 36' and back to the external source. The remainder of the motor pump unit is the same as illustrated in Figs. 1 and 1A and operates as described above.

We have thus provided a unique sealed motor pump unit with two types of bearings that can be interchanged without changing the basic unit. When pressurized bearings are installed in our motor pump unit, the pump fluid that is allowed to seep by the labyrinth shaft seal and fill the stator opening is used as the pressurized fluid with the pressure supplied by external means. We prefer to use an external pressurizing device so that pressurized fluid can be supplied to the bearings during the starting operation of the motor pump unit. In addition, we hermetically seal the external pressurizing device to the conduits 36' and 32' shown in Fig. 3 in order to minimize the danger of fluid escaping from the pumping system and to maintain a hermetically sealed unit.

Figure 4:
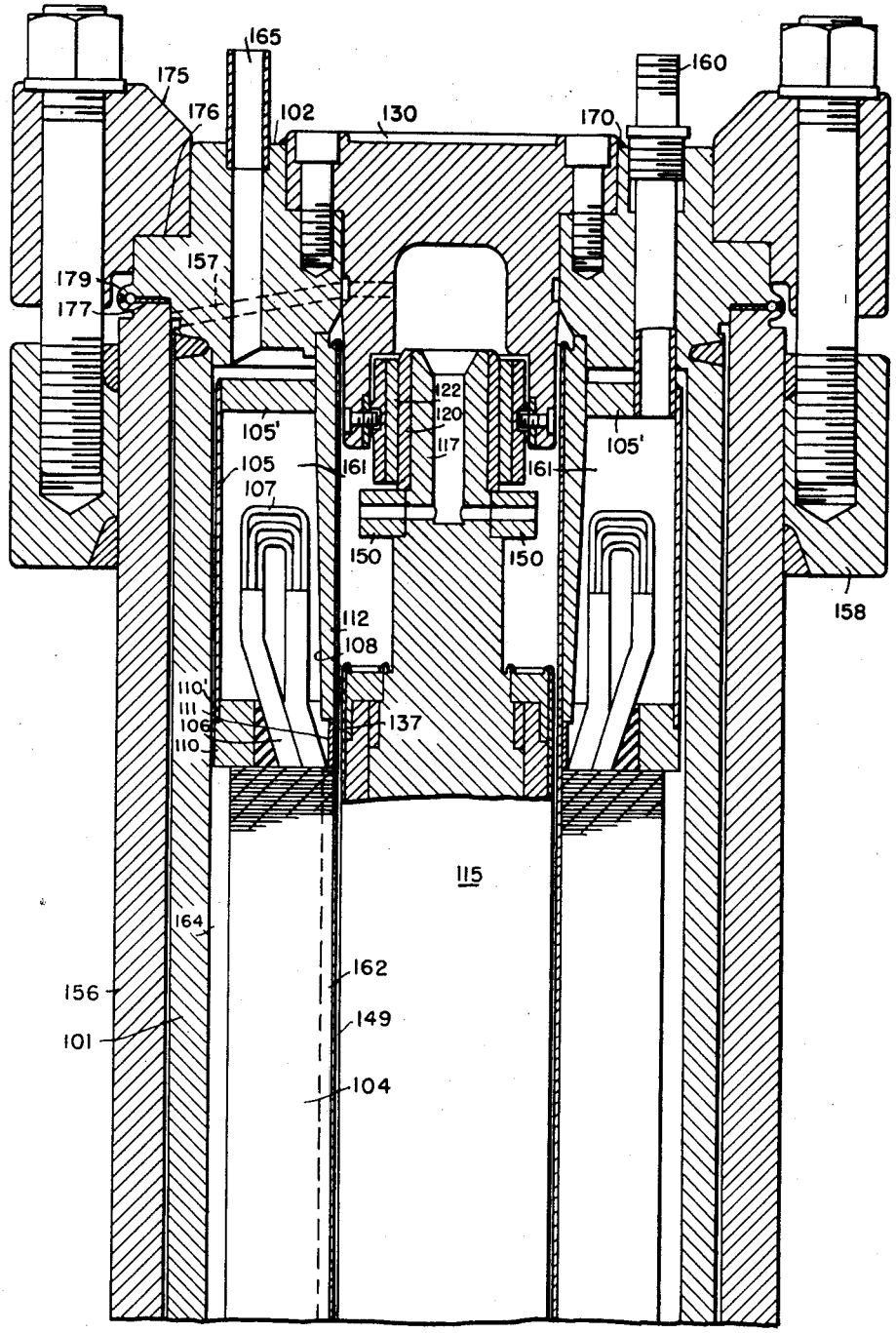
Fig. 4 is a partial longitudinal section of the upper end of a motor pump unit showing another embodiment of our invention.
Figure 4A:
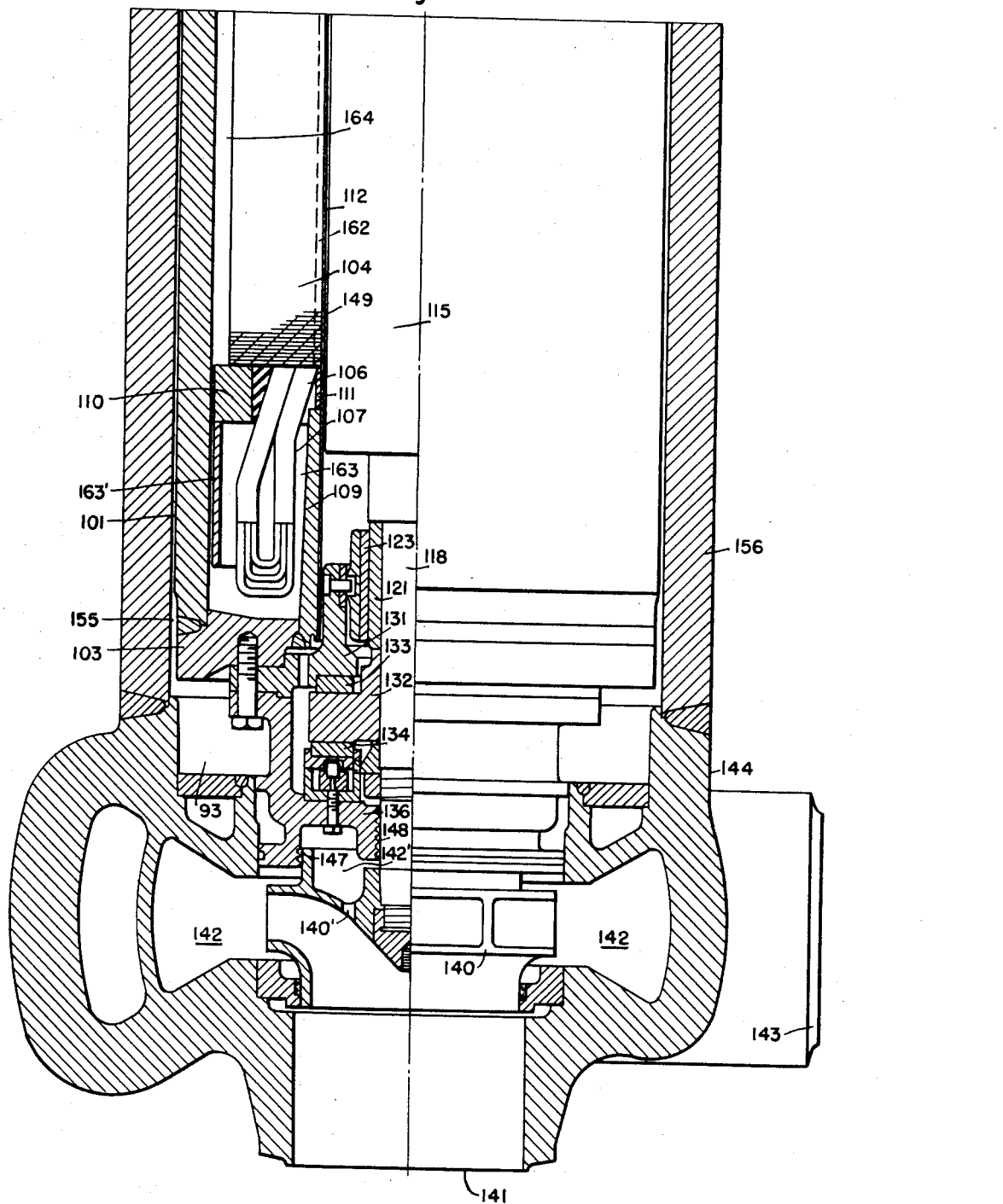
Fig. 4A is a partial longitudinal section of the lower end of the motor pump unit shown in Fig. 4.

Figs. 4 and 4A represent another embodiment of our invention similar to that shown in Figs. 1 and 1A except for certain features of the cooling system. The construction of this unit being similar to the unit shown in Figs. 1 and 1A only a general description will be given except for those elements that are materially different. The unit consists of a solid tubular motor frame 101 having annular end plates 102 and 103 welded to opposite ends. Stator laminations 104 having slots for suitable windings 106, are hermetically sealed in motor frame 101 by means of a thin walled cylinder 112, backed up by the stator laminations and end cylinders 108 and 109, annular finger rings 110 and annular rings 111, similar to the structure of Figs. 1 and 1A. End turns 107 at one end (Fig. 4) are enclosed by an outer cylinder 105 which is supported at one end in an annular groove 110' in finger ring 110, and welded at the other end to annular ring 105' which is welded on its inner periphery to back up cylinder 108.

A rotor 115, similar in construction to rotor 15 in Figs. 1 and 1A, is hermetically sealed by a thin walled cylinder 137 in the same manner as rotor 15, and has shaft extensions 117 and 118 at opposite ends. Upper and lower bearing journals 120 and 121 are shrunk on upper and lower shaft extensions 117 and 118, respectively, and are rotatably mounted in sleeve bearings 122 and 123, respectively. Sleeve bearings 122 and 123 are mounted in a manner similar to bearings 22 and 23 in Figs. 1 and 1A and are supported on annular bearing support members 130 and 131, respectively. Bearing support member 130 is attached to motor end plate 102 by any suitable means such as bolts which pass through an outward projecting flange on bearing support 130. Bearing support 130 also serves as an end cap to close the opening in the motor end plate 102 and may be sealed by a small weld 170 which prevents any leakage through the opening in end plate 102. Axial thrust is absorbed by thrust runner 132 on shaft extension 118, and cooperating thrust bearings 133 and 134, which in turn are supported by members 131 and 136, respectively. This arrangement is similar to that disclosed in Fig. 1A for thrust runner 32 and thrust bearings 33 and 34.

A rotary pump impeller 140 of the centrifugal type is mounted on shaft extension 118 and operates in the same manner as impeller 40 in Fig. 1A to draw fluid in through inlet 141 of the pump casing 144 and discharge it through the outlet 143. A plurality of passages 140' (only one of which is shown) in impeller 140 are designed to allow suction pressure of the fluid access to cavity 142' on the opposite side of impeller 140 to partly compensate for the hydraulic unbalance of impeller 140. Labyrinth seal 147 prevents the fluid from flowing freely into the cavity 142' from pump cavity 142. The fluid in cavity 142' is prevented from freely flowing into the motor unit by labyrinth seal 148 but is allowed to seep by so that the stator opening 149 and the remainder of the motor unit are filled with fluid at substantially full system pressure. Surrounding the motor frame 101 and spaced radially from it is a solid outer tube 156 which is welded at one end to pump casing 144 (Fig. 4A).

The motor unit including the frame 101, bearings, motor and pump impeller is attached to the outer tube 156 and the pump casing 144, which have previously been installed in the pumping system, by means of a clamping ring 175 which is bolted to a heavy annular ring 158 attached to the outer tube 156 by any suitable means such as welding and cooperates with a flange 176 on the motor end plate 102, to draw the motor unit into a pressure-tight seal with the adjacent end of the outer tube 156. A gasket 177, preferably of ductile metal, such as copper, is positioned between flange 176 and the end of outer tube 156 to effect a pressure-tight seal. A small seal weld 179 is used to hermetically seal the motor unit to the outer tube 156 in a manner similar to that described for seal weld 70 in Fig. 1. Seal weld 179 can be checked for leakage by the same method disclosed in connection with Fig. 1 for checking seal weld 70, however, the passageway through which the helium is introduced is not shown in Fig. 4.

The cooling and lubricating system of the unit disclosed in Fig. 4 and Fig. 4A is similar to that disclosed in Figs. 1 and 1A but is modified in some elements to improve its operation. An auxiliary impeller 150 which is shrunk on shaft extension 117 ahead of journal bearing 120 circulates the major part of the fluid through the annular space between the stator and the rotor, with the remainder flowing upward past bearing 122 and returning to the suction side of auxiliary impeller 150. The majority of the fluid, after flowing through the annular space between the rotor and the stator, flows past bearing 123 and thrust bearings 133 and 134 into annular cavity 93 by means of suitable flow passages (not shown). It then flows back through the annular space 155 between the motor frame 101 and the outer tube 156 and returns through passageways 157 in motor end plate 102 and bearing support 130 to the suction side of auxiliary impeller 150. We have thus somewhat simplified the construction shown in Figs. 1 and 1A by substituting the annular space 155 for the coiled tubes 56 of Figs. 1 and 1A, while at the same time maintaining an efficient cooling system by keeping the annular space 155 small in cross-section thereby increasing the velocity of flow of the fluid past the motor frame 101 which increases the heat transfer from the motor frame 101 to the fluid.

An external cooling medium, preferably an insulating oil, may be provided for the stator 104 and introduced through an inlet 160 extending through end plate 102 and ring 105' into the annular stator space 161 where it circulates around the end turns 107 in space 161. It then flows through a number of longitudinal slots 162 formed on the inner periphery of the stator 104 and closed by cylinder 112, to the opposite end of the stator. The cooling medium then flows into an annular space 163 where it circulates around the end turns 107 at the other end of the stator windings 106, then outward around the free end of tubular baffle 163' which is welded at its other end to finger ring 110 (Fig. 4A) and through the longitudinal slot 164 formed in the stator laminations 104 and the motor frame 101, then through outlet 165 in motor end plate 102 and back to the external source.

The stator cooling system disclosed above, while highly efficient in cooling the stator and its windings remains relatively simple and easy to manufacture. The cooling medium in flowing through many small longitudinal slots on the inner periphery of the stator is in contact with a large area of the stator, and due to the small cross sectional area of these slots the cooling medium must flow at a rapid rate thus effectively cooling the stator without adding to the size or complication of the complete unit. In addition, the cooling medium will be in contact with the outer surface of the thin walled cylinder 112 which seals the stator in the motor frame and thus assists in cooling the remainder of the unit by absorbing heat from the fluid circulated in the stator opening. In returning the fluid to the external source by means of the longitudinal slots on the outer periphery of the stator we have provided an additional area of contact between the fluid and the stator thus removing additional heat from the motor unit.

Figure 5:
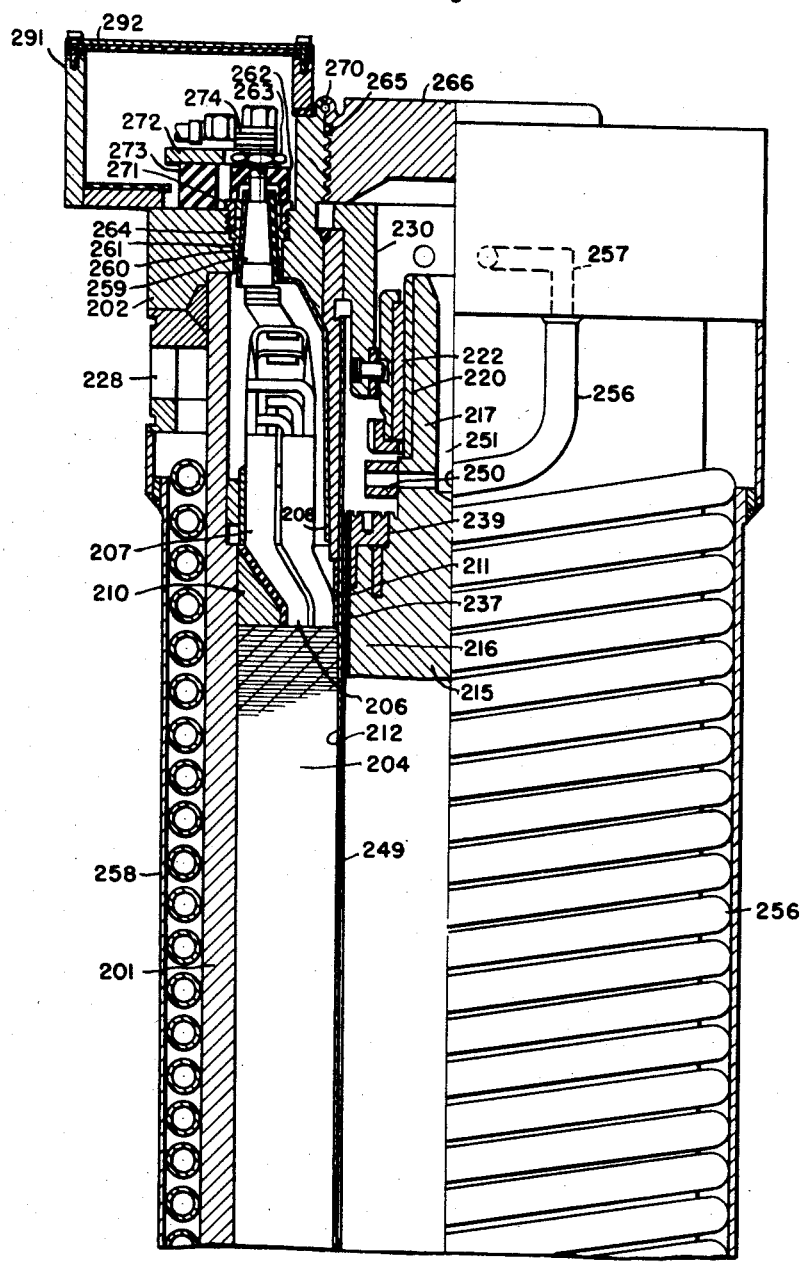
Fig. 5 is a partial longitudinal section of the upper end of a motor pump unit showing another embodiment of our invention.
Figure 5A:
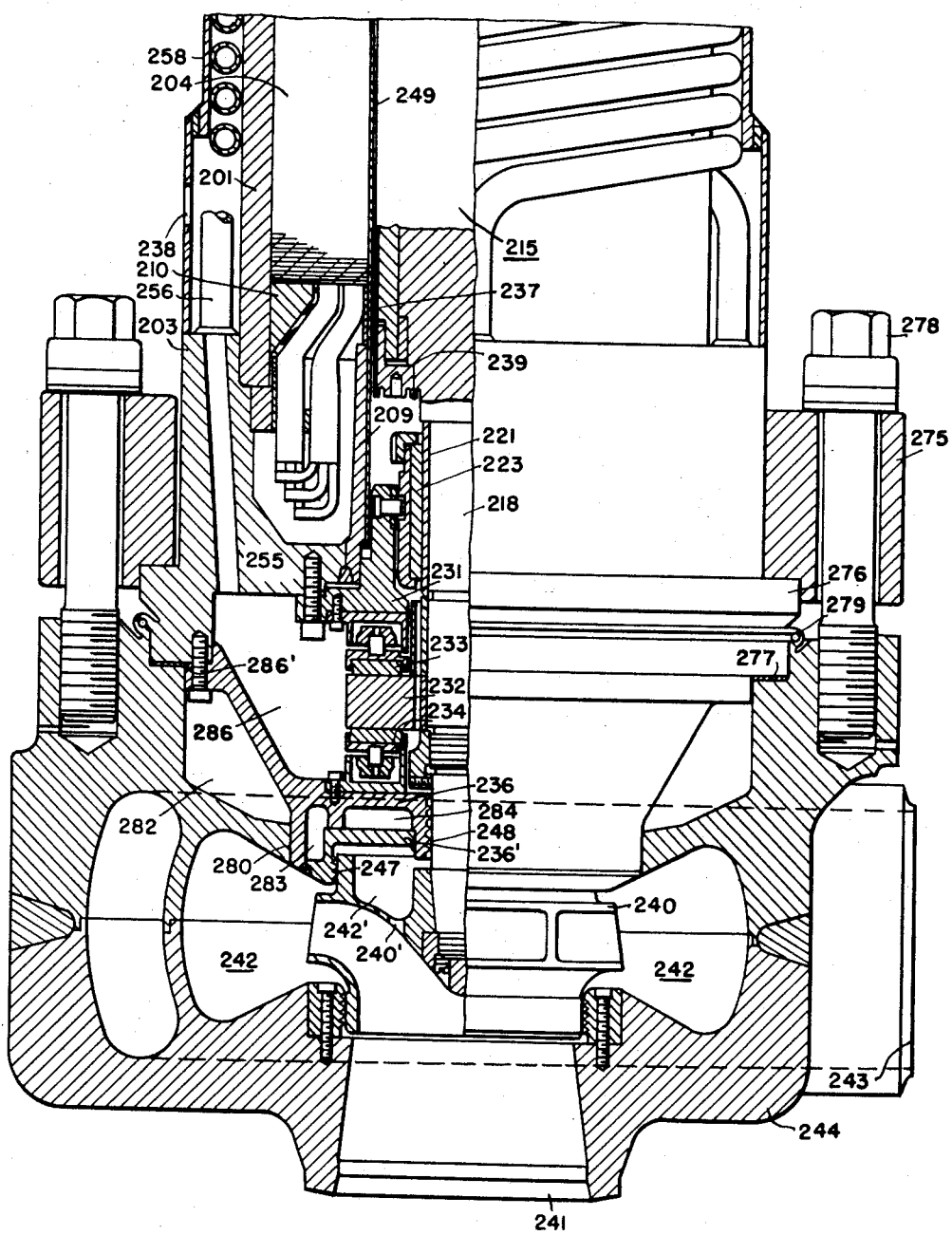
Fig. 5A is a partial longitudinal section of the lower end of the motor pump unit shown in Fig. 5.

Figs. 5 and 5A show another embodiment of our invention similar to that shown in Figs. 1 and 1A, with the additional provision of a pressure-tight sealed terminal for the stator windings and a thermal barrier of unique and simplified construction. The general construction of this embodiment of our invention is similar to that shown and described in Figs. 1 and 1A and only those elements that differ materially will be described in detail. A solid tubular motor frame 201 has annular end plates 202 and 203 welded at each end. Stator laminations 204 having a suitable stator winding 206 are hermetically sealed in the motor frame by means of a thin walled cylinder 212, backed up by ring structures consisting of cylinders 208 and 209, and annular finger rings 210 and rings 211 utilizing the same method as disclosed in Figs. 1 and 1A for sealing stator 4 in motor frame 1. A rotor 215 containing a suitable squirrel-cage winding 216, and having shaft extensions 217 and 218 at its upper and lower ends, respectively, is hermetically sealed by means of a thin walled cylinder 237 which is hermetically sealed to heavy annular rings 239 positioned at each end of the rotor 215 utilizing the same construction as disclosed in Figs. 1 and 1A for hermetically sealing rotor 15 in thin walled cylinder 37. Suitable bearing journals 220 and 221 are shrunk on shaft extensions 217 and 218, respectively, and are rotatably supported in sleeve bearings 222 and 223, respectively. Bearings 222 and 223 are enclosed in suitable housings which are supported by members 230 and 231, respectively, mounted on the respective end plates 202 and 203 in a manner similar to that disclosed in Figs. 1 and 1A.

Axial thrust of the unit is absorbed by means of a thrust runner 232 and cooperating pivoted pad thrust bearing pads 233 and 234. Thrust pads 233 and 234 are supported by members 231 and 236, respectively, with member 236 being rigidly bolted to motor end plate 203. The arrangement described above for absorbing the axial thrust of the unit is similar to that disclosed in Figs. 1 and 1A except stationary thrust bearing 33 of Fig. 1A has been replaced with a pivoted pad thrust bearing 233 similar to thrust bearing 34 of Fig. 1A.

A rotary pump impeller 240 of the centrifugal type draws the fluid in through suction opening 241 in pump casing 244 and impels it radially outward into annular area 242 and out discharge opening 243 in the pump casing. A plurality of openings 240' (only one of which is shown) in impeller 240 are designed to allow suction pressure of the fluid access to annular cavity 242' on the opposite side of impeller 240 to partly compensate for the hydraulic unbalance of impeller 240. The fluid in area 242 is prevented from flowing into the cavity 242' by labyrinth seal 247. Fluid in cavity 242' is prevented from freely flowing into the motor unit by a labyrinth seal 248 but is allowed to seep by this seal so as to fill the stator opening 249 and the remainder of the motor unit with fluid at substantially the same pressure as the fluid in area 242. Although the fluid fills the motor unit, it is isolated from the motor windings by the thin walled cylinders 212 and 237 which hermetically enclose the motor windings.

The opening in upper motor end plate 202 is sealed by means of a threaded cap 266 and O ring 265, the latter preferably being formed of a resilient material, such as neoprene. In addition to sealing motor end plate 202, the cap 266 retains bearing support member 230 in place. The cap 266 and motor end plate 202 are hermetically sealed by a seal weld 270 which is similar in construction to seal weld 70 in Figs. 1 and 1A, and can be checked for leakage by the same method used in checking seal weld 70.

The motor unit including the bearings and pump impeller is attached to the pump casing 244 by means of clamping ring 275 and cooperating flange 276 projecting from motor end plate 203. Bolts 278 are used to draw the motor unit into a pressure-tight seal with the pump casing 244, with a copper or the like gasket 277 being positioned between these two members to effect a seal. The motor unit and pump casing 244 are hermetically sealed by a small seal weld 279 which is similar in construction to seal weld 79 in Fig. 1A and is checked for leakage by the same method used in checking seal weld 79 in Fig. 1.

An auxiliary impeller 250 circulates the fluid contained in the stator opening 249 through the air gap between the rotor 215 and the stator 204. Part of the fluid discharged from impeller 250 flows past the bearing 222 but the major part flows through the air gap between the rotor and stator and then past bearing 221 and thrust bearings 233 and 234. The fluid then flows into annular cavity 286 from which it enters coiled tubes 256, by means of passages 255 through end plate 203. The fluid circulates through the coiled tubes 256, thereby cooling the stator, and back to auxiliary impeller suction inlet 251 by means of passages 257 in end plate 202 and bearing support 230.

Surrounding the coiled tubes 256 is a composite outer tubular casing 258, the coiled tubes being in intimate contact with both the motor frame 201 on one side and with outer casing 258 on the other side. We have positioned these tubes in intimate metal-to-metal contact with both the motor frame and outer casing in order to provide a direct path through the metal members of the units to the cooling medium for the heat generated in the stator, and to prevent the bypass of the secondary cooling fluid which flows outside of and around tubes 256. Also by providing intimate contact between the coiled tubes 256 and the motor frame 201 and casing 258, we have provided a spiral path for an external secondary coolant, which can be introduced through an inlet opening 228 at the upper end of composite casing 258 adjacent end plate 202 and returned to the external source through an outlet opening 238 at the lower end of casing 258. In this way, the secondary coolant will be flowing in the opposite direction to the flow of fluid through coiled tubes 256 and in contact with coiled tubes 256, thus effectively cooling the fluid circulating in the cooling system when the motor pump unit is installed in a system pumping fluids at elevated temperatures. Another feature of this cooling system is the fact that all of the fluid from the pumping system utilized in the cooling system is contained inside the outer casing 258, and no external connections involving the fluid from the pumping system are necessary. This is especially important where the fluid in the pumping system is highly dangerous and any leakage would be harmful, since all elements of the motor unit cooling system are assembled during manufacture and can thus be tested individually at many times system pressure.

Figure 6:
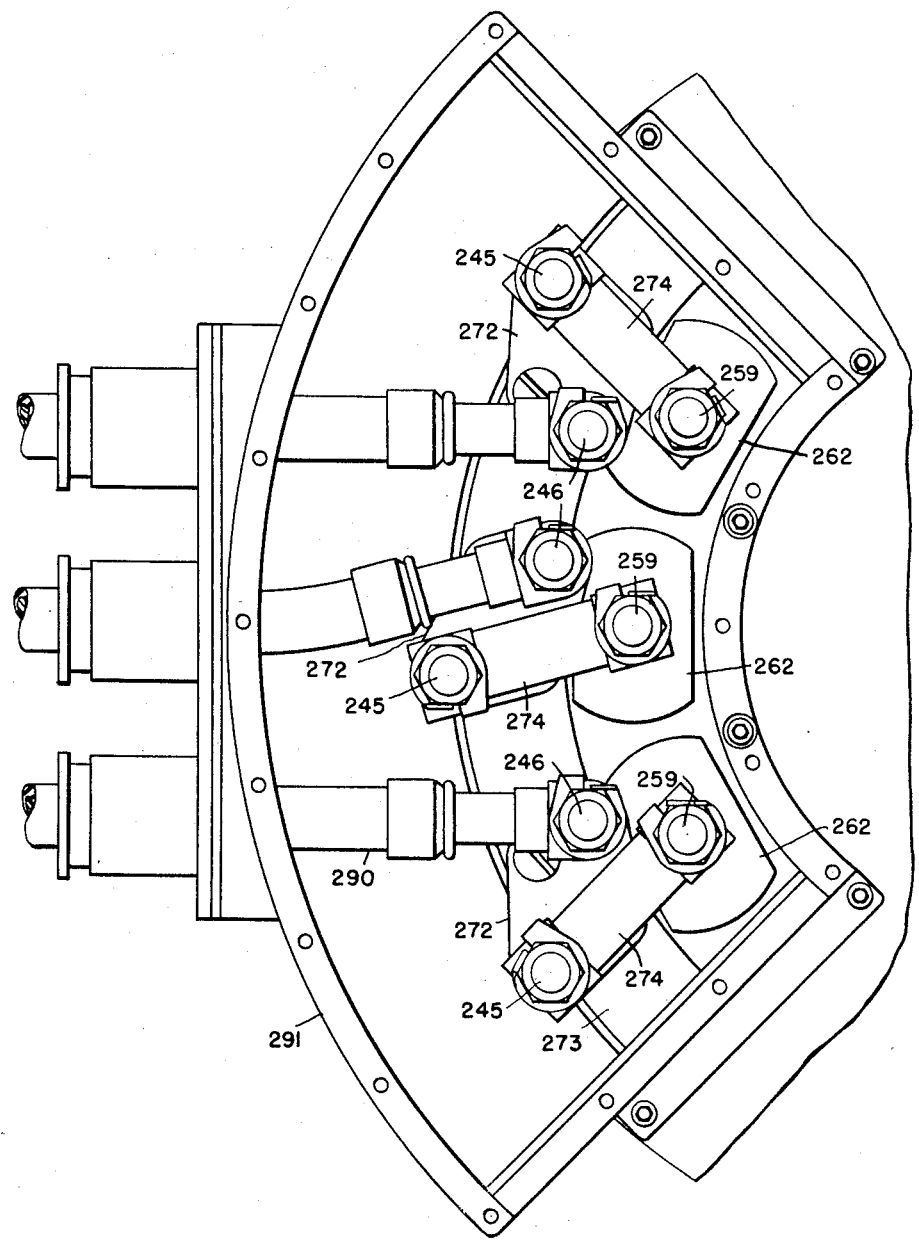
Fig. 6 is a top view of the terminal box shown in Fig. 5, with the cover removed, drawn to an enlarged scale.

The stator end turns 207 at the top (Fig. 5) are connected to tapered terminal posts 259, of which three are used in the motor shown due to the three phase stator winding. The terminal posts 259 pass through openings in motor end plate 202 and each opening in end plate 202 has a tapered bushing 261 with an outward projecting flange for engaging a mating shoulder in the opening in end plate 202. Each bushing 261 is sealed in the opening by means of a small O-ring 264, preferably of a resilient material such as neoprene, and a threaded gland 271. Each tapered terminal post 259 is sealed in the tapered bushing 261 by means of a tapered sealing and insulating sleeve 260, preferably of a resilient insulating material, such as nylon, and is drawn into pressure-tight contact with the tapered bushing 261 by means of a bridge member 262, preferably of an insulating material, such as a molded plastic, and nut 263 on the terminal post 259 (Figs. 5 and 6). On the outer side of end plate 202, a plate 272 for each terminal post (Figs. 5 and 6), preferably of an electrical conducting material, such as copper, is rigidly mounted on a block 273, formed from insulating material such as a molded plastic material. The block 273 in turn is rigidly attached to the motor end plate 202 in any desired way, for example by screws (not shown). Each tapered terminal 259 is connected to a plate 272 by means of flexible shunt 274 of a braided or laminated electrical conducting material, such as braided copper, which is attached to a stud 245 on plate 272. An auxiliary terminal post 246 is provided on each plate 272 to which a supply conductor 290 may be attached. A composite casing 291 is provided for enclosing the terminals and is provided with a removal cover 292 so that access can be gained to the terminals. By means of this arrangement, the force used in attaching the supply conductor is not transmitted to the terminal posts 259 since the supply conductor is attached to an independent auxiliary terminal post which in turn is connected to terminal post by a flexible shunt. In previous designs, much difficulty has been experienced with leakage around terminal posts in cases where the thin walled cylinders encasing the stator have ruptured allowing fluid to escape, since the sealing arrangement was disturbed each time the supply conductors were attached or detached.

We have also provided means for replacing the sealing sleeve 260 which seals the terminal post in the motor end plate without disturbing the terminal post 259, which is important in a motor unit where the stator is hermetically sealed in the motor frame. In order to change our terminal seal, one only has to remove the flexible shunt 274, the nut 263 and bridge member 262 from the terminal. Then, by removing the gland 271 and bushing 261, the tapered seal 260 may be removed. In previous designs, it was necessary to remove the terminal from the inside of the motor frame first before the seal ring could be replaced, due to the tapered nature of the terminal and this is impossible unless the hermetic seals sealing the stator are first broken. It would also be necessary to disassemble the unit in order to gain access to the hermetic seals sealing the stator.

The simplified thermal barrier of this embodiment of our invention is formed by bearing support member 236 which includes cavities 283 and 284 therein sealed by annular plate 236' welded to member 236 over the cavities. The dead air spaces contained within cavities 283 and 284 act as a barrier to the transfer of heat from the fluid in the pump casing to the fluid in the stator opening. Bearing support member 236, together with a part of the pump casing 244, enclose an annular area 282 which has restricted access to the fluid in the annular pump area 242 because of the joint 280 and is closed to the cavity 286 in the motor unit because of the bolted sealed joint at 286'. This cavity 282 of stagnant fluid also acts as an effective thermal barrier to the transfer of heat from the fluid in annular area 242 to the fluid in cavity 286. By sealing the bearing support member 236 to the motor end plate 203, we have prevented the fluid from circulating from the cavity 242' past the labyrinth seal 248 through the thrust bearings 233 and 234 and into the cavity 286 and then back to the annular pump area 242. By eliminating any such circulation in this area, we have been able to maintain the fluid in the motor unit at a temperature considerably below that contained in the pump unit, since all heat must be transferred by diffusion through the fluid along labyrinth seal 248.

By including part of the thermal barrier as an integral part of bearing support 236 and utilizing the pump casing 244 and bearing support 236 to form the remainder we have used this one member to serve the purpose of the two members 36 and 80 in Fig. 1A, thus simplifying construction. Also by sealing the bearing support 236 to end plate 203 we have eliminated the need for the annular spring 85 (Fig. 1A) which is both difficult to manufacture and may fail in service.

We have thus provided motor pump units in Figs. 1, 1A, 4, 4A, 5 and 5A which are simple to manufacture and completely sealed so that they can be operated in pumping systems with substantially zero leakage allowance. Our units are designed to operate with the motor unit submerged in the fluid being pumped, but by means of a unique method of hermetically enclosing the motor windings they are isolated from the pumped fluid. The fluid in the motor unit is circulated by means of an auxiliary impeller through a closed cooling system to cool the unit and lubricate its bearings. In utilizing the pumped fluid as a cooling medium we have eliminated external connections, thus reducing the possibility of fluid escaping from the system. In order to maintain the fluid in the motor unit at a temperature sufficiently low to act as a cooling medium, we have provided novel thermal barriers to retard the transfer of heat between the pump unit and motor unit. In the unit shown in Figs. 5 and 5A we have simplified this thermal barrier so that one composite member serves as both a support for the thrust bearing and a thermal barrier. Also in the unit shown in Figs. 5 and 5A we have provided a new type of leak proof motor terminal so that in case the thin walled cylinder enclosing the stator windings should rupture none of the fluid will escape from the system.

We claim as our invention:

1. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, the other end of said motor frame being secured to said pump casing, means for establishing fluid communication between the opening of said stator and said pump casing so that the aforesaid rotor is immersed in the pumped fluid, an outer casing for said motor frame radially spaced from said motor frame, a cooling system located outside of the motor frame but within the outer casing and communicating with the stator opening and means for circulating the pumped fluid through said stator opening and through said cooling system, a stator cooling system comprising means for circulating a cooling medium around the end turns of one end of said stator, then through the stator space adjacent the inner peripheral surface of said stator, then around the end turns at the other end of said stator and then back through the stator space adjacent the outer peripheral surface of said stator for cooling said motor.

2. A hermetically sealed motor pump unit comprising a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, the other end of said motor frame being secured to said pump casing, means for establishing fluid communication between the opening of said stator and said pump casing, so that the aforesaid rotor is immersed in the pumped fluid, an outer casing for said motor frame radially spaced from said motor frame, a cooling system located outside of the motor frame but within the outer casing and communicating with the stator opening, and means for circulating the pumped fluid through said stator opening and through said cooling system, a thermal barrier comprising an annular member between the aforesaid pump casing and motor frame which is sealed on its outer circumference to said motor frame and having a labyrinth seal on the inner peripheral surface in substantial engagement with said rotor shaft extension on which said rotary pump impeller is mounted, so that said thermal barrier can prevent the circulation of fluid between said pump casing and said stator opening, said thermal barrier in addition including a plurality of enclosed spaces.

3. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, the other end of said motor frame being secured to said pump casing, means for establishing fluid communication between the opening of said stator and said pump casing, so that the aforesaid rotor is immersed in the pumped fluid, an outer casing for said motor frame radially spaced from said motor frame, a cooling system located outside of the motor frame but within the outer casing and communicating with the stator opening, means for circulating the pumped fluid through said stator opening and through said cooling system, a thermal barrier comprising an annular member between the aforesaid pump casing and motor frame, sealed on the outer circumference to said motor frame and having a labyrinth seal on the inner peripheral surface for sealing on said rotor shaft extension on which said rotary pump impeller is mounted, said annular member enclosing a sealed cavity, so that said thermal barrier can limit the flow of heat from the fluid in the pump casing to the fluid in the stator opening to that caused by diffusion along the aforesaid labyrinth seal.

4. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, the other end of said motor frame being secured to said pump casing, means for establishing fluid communication between the opening of said stator and said pump casing, so that the aforesaid rotor is immersed in the pumped fluid, an outer casing for said motor frame radially spaced from said motor frame, a cooling system located outside of the motor frame but within the outer casing and communicating with the stator opening and means for circulating the pumped fluid through said stator opening and through said cooling system, a thermal barrier comprising an annular member attached to said motor casing and forming a cavity between the aforesaid pump casing and said annular member, means for sealing said cavity from the stator opening and allowing limited access between the fluid in said pump casing and said cavity including a labyrinth seal on the inner peripheral surface of said annular member for sealing the rotor shaft extension on which said rotary pump impeller is mounted, so that said thermal barrier can prevent the circulation of fluid between said pump casing and said stator opening and limit the heat flow from the fluid in said pump casing to the motor to that caused by diffusion along the aforesaid labyrinth shaft seal.

5. An electric motor comprising a solid tubular motor frame containing a stator, a rotor and a shaft rotatably mounted in said frame, said stator having a core and windings, a thin-walled metal cylinder encasing said rotor, said cylinder being supported throughout its length by said rotor, relatively heavy annular rings located on each end of the rotor and supporting the ends of said cylinder, said cylinder being hermetically sealed to said annular rings and said annular rings being hermetically sealed to the adjacent end of the rotor to form a gas-tight enclosure for said rotor, another thin-walled metal cylinder extending through the stator opening and being supported throughout its length by said stator core, a pair of ring structures supporting the ends of said cylinder, respectively, each of said ring structures comprising a substantially thick rigid cylindrical member hermetically sealed at one end to the motor frame and enclosing the end turns of the stator windings and a heavy ring positioned between the other end of the cylindrical member and the adjacent end of the stator core and supporting the other end of said member, said heavy ring having radial slots for receiving the stator windings, another ring positioned on the inner periphery of said heavy ring to form a continuous annular surface located between the stator core and rigid cylindrical member, and said other thin-walled cylinder being hermetically sealed to said rigid outer cylindrical members to form a gas-tight enclosure for said stator.

6. An electric motor comprising a solid tubular motor frame containing a hollow stator assembly, a rotor and shaft rotatably mounted in said frame for rotation within said stator, said stator having a core and windings, a thin-walled metal cylinder extending through the stator opening and being supported throughout its length by said stator core, a pair of ring structures supporting the ends of said cylinder and each including a substantially thick rigid cylindrical member hermetically sealed at one of its ends to the motor frame and enclosing the adjacent end turns of the stator windings, a heavy annular ring positioned at each end of the stator core and supporting the other ends of said cylindrical members, respectively, said ring having radial slots for receiving the stator windings, another ring positioned on the inner periphery of each of said heavy annular rings to form a continuous surface between the stator core and each rigid outer cylindrical member, said thin-walled cylinder being hermetically sealed to said rigid outer cylindrical members to hermetically enclose said stator with said thin-walled metal cylinder so that the latter is supported throughout its length so as to withstand extremely high pressures.

7. An electric motor comprising a solid tubular motor frame containing a hollow stator having a core and windings, said core being formed of magnetic material, a rotor and shaft rotatably mounted in said frame within said stator, said rotor being formed of magnetic material, a thin-walled corrosion resisting nonmagnetic metal cylinder extending through the stator opening and being supported throughout its length by said stator core, a pair of ring structures supporting respective ends of said cylinder, each of said ring structures comprising a substantially thick rigid cylindrical member of corrosion resisting nonmagnetic metal, said cylindrical member being hermetically sealed at one of its ends to the motor frame and enclosing the adjacent end turns of the stator windings, a heavy annular ring supporting the opposite end of each of said members and positioned at the adjacent end of the stator core, each of said annular rings having radial slots for receiving the stator windings, another ring positioned on the inner periphery of each of said heavy annular rings to form a continuous surface between the stator core and adjacent rigid outer cylinder, said thin-walled cylinder being hermetically sealed to said rigid outer cylindrical members, thereby hermetically enclosing said stator within a corrosion resistant casing.

8. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, a plurality of electric terminals, means for hermetically enclosing said stator in said motor frame including means for hermetically sealing said terminals for said stator in said motor frame, each of said terminal sealing means comprising a tapered terminal post passing through the aforesaid motor frame and insulated therefrom, a plate of electrical conducting material attached to the outside of said motor frame and insulated therefrom, a flexible shunt connecting said tapered terminal to said plate, an auxiliary terminal post mounted on said plate to which a supply conductor may be secured, and means for hermetically sealing the end of the motor frame adjacent the other said shaft extension, the other end of said motor frame being secured to said pump casing, means for establishing fluid communication between the opening of said stator and said pump casing so that the aforesaid rotor is immersed in the pumped fluid.

9. A hermetically sealed motor pump unit comprising a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, the other end of said motor frame being secured to said pump casing, means for establishing fluid communication between the opening of said stator and said pump casing, so that the aforesaid rotor is immersed in the pumped fluid, an outer casing for said motor frame radially spaced from said motor frame, a thermal barrier comprising an annular member between the aforesaid pump casing and motor frame which is sealed on its outer circumference to said motor frame and having a labyrinth seal on the inner peripheral surface in substantial engagement with said rotor shaft extension on which said rotary pump impeller is mounted, so that said labyrinth seal cooperates with said thermal barrier to prevent the circulation of fluid between said pump casing and said stator opening.

10. A hermetically sealed electrical terminal capable of withstanding extremely high pressures comprising a tapered terminal with a tapered seal ring adapted to slip over said tapered terminal, a tapered metal tube adapted to slip over said sealing ring, means for removably sealing said tapered metal tube in a member through which the aforesaid tapered terminal passes, means for forcing said tapered terminal and seal ring into pressure-tight contact with the aforesaid metal tube, a plate of electrical conducting material attached to said member and insulated therefrom, a flexible shunt for connecting said tapered terminal to said plate, an auxiliary terminal on said plate to which a supply conductor may be secured, thereby providing a hermetically sealed terminal free from stresses created by the supply conductor.

11. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, means for hermetically attaching the aforesaid motor frame to said pump casing, said means comprising a clamping ring adapted to engage a flange on said motor frame, means for securing the clamping ring to the pump casing and drawing said motor frame flange into pressure sealing contact with said pump casing, and a small seal weld joining said motor frame to said pump casing thereby hermetically sealing the motor frame to the pump casing and allowing removal of the motor and pump impeller as a unit from a sealed pumping system including the pump casing by removing said securing means and breaking the seal weld.

12. A hermetically sealed motor pump unit comprising, a pump casing, an electric motor unit having a casing hermetically sealed except for the end to be attached to the pump casing, means for hermetically attaching said electric motor unit casing to said pump casing, said means comprising a clamping ring, adapted to engage a flange on said motor unit casing, means for securing the clamping ring to the pump casing and drawing said flange on the motor casing into pressure sealing contact with said pump casing, and a small seal weld for hermetically sealing said flange on the motor to said pump casing thereby hermetically sealing the motor unit to the pump casing and allowing removal of the motor unit from the pump casing by removing said securing means and breaking the seal weld.

13. A hermetically sealed motor pump unit comprising, a rotary pump impeller, a pump casing therefor, an electric motor having a rotor with shaft extensions at both ends and having pressurized bearings on said extensions, said impeller being mounted on one of the shaft extensions adjacent one of said pressurized bearings, a solid tubular motor frame containing a stator having an opening in which said rotor is mounted, means for hermetically enclosing said stator in said motor frame and hermetically sealing the end of the motor frame adjacent the other of said pressurized bearings, the other end of said motor frame being secured to said pump casing, means for establishing fluid communication between the opening of said stator and said pump casing, the aforesaid rotor thereby being immersed in the pump fluid, an outer casing for said motor frame radially spaced from said motor frame, a cooling and lubricating system located within said outer casing, means for circulating the fluid in said stator opening through said cooling and lubricating system under pressure, passages for supplying said fluid under pressure to the aforementioned pressurized bearings, removable means for rendering said passages inoperative when a different type of bearing is substituted for said pressurized bearings, thereby providing means for interchanging different types of bearings without altering the motor pump unit.

14. In a hermetically sealed motor pump unit comprising a motor having a rotor, rotor shaft and stator, said rotor shaft being mounted with pressurized journal bearings at the opposite ends, a pump having a rotary impeller mounted on an extension of said rotor shaft, a pump casing, said motor being secured to said pump casing, means for circulating a lubricating fluid under pressure through passages to said pressurized bearings, additional removable means for rendering some of said passages inoperative when a different type of bearing is substituted for said pressurized bearing, thereby providing means for interchanging different types of bearings without altering the motor pump unit.

15. A hermetically sealed motor pump unit comprising, a rotary pump impeller, a pump casing therefor, an electric motor having a rotor with shaft extensions at both ends and having bearings at each end, said impeller being mounted on one of said shaft extensions, a solid tubular motor frame containing a stator having an opening in which said rotor is mounted, means for hermetically enclosing said stator in said motor frame and hermetically sealing the end of the motor frame adjacent the other of said shaft extensions, means for hermetically attaching the aforesaid motor frame to said pump casing, said means comprising a clamping ring adapted to engage a flange on said motor frame, means for securing the clamping ring to the pump casing and drawing said motor frame flange into pressure sealing contact with said pump casing and a small seal weld joining said motor frame to said pump casing, said seal weld being comprised of converging relatively thin flanges projecting from both said motor flange and said pump casing outwardly of the area where the said motor frame and said pump casing are joined, said curved flanges being welded together at their outer ends so as to enclose a ring-like area, means for introducing a gas into said ring area under high pressure to check said seal weld for leakage independent of system pressure.

16. In a hermetically sealed motor pump unit, a seal weld for hermetically sealing the motor to the pump, said seal weld comprised of convergent relatively thin flanges projecting from both said motor frame and said pump casing in the area where the said motor frame and said pump casing are joined, said flanges being welded together at their outer edge so as to enclose a ring-like area, means for introducing a gas into said ring area under high pressure to check said seal weld for leakage independent of system pressure.

17. A detachable motor pump unit comprising a housing closed at one end, a hollow stator assembly mounted within said housing, a rotor and shaft rotatably mounted within said stator, a pump impeller secured to said shaft in spaced relationship relative to said rotor, a pump casing enclosing said impeller and secured to the open end of said housing in communication therewith, a pair of adjacent inwardly extending flanges located on said housing and on said casing, respectively, the inner diameter of said casing flange being larger than the outer diameter of said impeller, whereby said impeller can be withdrawn from said casing, an annular thermal barrier secured to said housing flange and seated against the outward face of said casing flange, and means for securing said casing to said housing to clamp said thermal barrier between said flanges.

18. A hermetically sealed motor pump unit comprising a housing, a hollow stator assembly mounted in said housing, a rotor and shaft mounted for rotation within said stator, a pump impeller secured to said shaft in spaced relationship relative to said rotor, means for hermetically enclosing said stator within said housing and for hermetically sealing the end of said housing opposite from said impeller, a pump casing enclosing said impeller, means for detachably sealing the other end of said housing to said casing, said last-mentioned means comprising a clamping ring, an outwardly extending shoulder formed on said housing and means for securing said clamping ring in engagement with said shoulder to said pump casing, and means for hermetically sealing the junction between said housing and said casing.

19. A hermetically sealed motor pump unit comprising a housing, a hollow stator assembly mounted in said housing, a rotor and shaft mounted for rotation within said stator, a pump impeller secured to said shaft in spaced relationship relative to said rotor, means for hermetically enclosing said stator within said housing and for hermetically sealing the end of said housing opposite from said impeller, a pump casing enclosing said impeller, means for hermetically and detachably securing the other end of said housing to said casing, said last-mentioned means comprising a clamping ring, an outwardly extending shoulder formed on said housing and means for securing said clamping ring in engagement with said shoulder to said pump casing, a pair of adjacent inwardly extending flanges located on said housing and on said casing respectively, an annular thermal barrier secured between said flanges, and means for hermetically sealing the junction between said housing and said casing.

20. A hermetically sealed motor pump unit comprising a housing, a hollow stator assembly mounted in said housing, a rotor and shaft mounted for rotation within said stator, a pump impeller secured to said shaft and in spaced relationship relative to said rotor, means for hermetically enclosing said stator within said housing and for hermetically sealing the end of said housing opposite from said impeller, a pump casing enclosing said impeller, means for hermetically and detachably securing the other end of said housing to said casing, said last-mentioned means comprising a clamping ring, an outwardly extending shoulder formed on said housing and means for securing said clamping ring in engagement with said shoulder to said pump casing, a pair of adjacent inwardly extending flanges located on said housing and on said casing respectively, an annular thermal barrier secured between said flanges, the inner diameter of said casing flange being larger than the outer diameter of the impeller to permit withdrawal of said impeller from said casing, and the inner diameter of said casing outwardly of said casing flange being at least slightly larger than the outer diameter of said thermal barrier to permit withdrawal of said barrier from said casing, and means for hermetically sealing the junction between said housing and said casing.

21. A sealed motor pump unit comprising a housing, a hollow stator assembly mounted in said housing, a rotor and shaft mounted for rotation within said stator, a pump impeller secured to said shaft in spaced relationship relative to said rotor, means for hermetically enclosing said stator within said housing and for closing the end of said housing opposite from said impeller, a pump casing enclosing said impeller, means for detachably securing the other end of said housing to said casing, said last-mentioned means comprising a clamping ring, an outwardly extending shoulder formed on said housing and means for securing said clamping ring in engagement with said shoulder to said pump casing, a pair of adjacent inwardly extending flanges located on said housing and on said casing respectively, and an annular thermal barrier secured between said flanges.

22. A sealed dynamoelectric machine comprising a tubular housing, a hollow stator assembly mounted within said housing, means for sealing said stator assembly, said sealing means defining a rotor chamber within said housing, a rotor mounted for rotation within said chamber, said rotor including an elongated supporting member and a plurality of windings terminating short of the ends of said supporting member, a pair of annular members joined to the ends respectively of said supporting member, said annular members being disposed adjacent the ends respectively of said windings, a tubular element surrounding said rotor and closely fitting therewith, said tubular element being joined at its ends to said annular members respectively, and means for sealing said tubular element to said annular members and for sealing said annular members to said supporting member in order to seal the interior of said rotor from said rotor chamber.

23. A sealed dynamoelectric machine comprising a tubular housing, a hollow stator assembly mounted within said housing, means for sealing said stator assembly, said sealing means defining a rotor chamber within said housing, a rotor mounted for rotation within said chamber, said rotor having an elongated support and a plurality of windings terminating short of the ends of said support respectively, a pair of electrically conductive connecting rings secured to said support adjacent the ends thereof respectively, said connecting rings electrically contacting the respective end portions of each of said windings, a pair of annular members joined to the ends respectively of said support and disposed adjacent the ends of said windings, means forming a part of said annular members for engaging the ends respectively of each of said windings to press said winding ends into electrical contact with said connecting rings, a tubular element surrounding said rotor and closely fitting therewith, said tubular element being joined at its ends to said annular members respectively, and means for sealing said tubular element to said annular members and for sealing said annular members to said supporting member in order to seal the interior of said rotor from said rotor chamber.

24. In a sealed dynamoelectric machine, a combination comprising a tubular housing, a hollow stator assembly mounted within said housing, means for sealing said stator assembly, said sealing means defining a rotor chamber within said housing, a rotor mounted for rotation within said chamber, said rotor including an elongated support and a plurality of windings terminating short of the ends respectively of said support, a sealing flange joined to each of said support ends, a pair of annular members disposed adjacent the ends of said windings and mounted on said support ends respectively, each of said annular members having a pair of sealing flanges, one of said last-mentioned sealing flanges being juxtaposed to the sealing flange at the adjacent end of said support, the other of said last-mentioned sealing flanges being disposed adjacent the outer periphery of the associated annular member, a tubular element surrounding said rotor and closely fitting therewith, the ends of said tubular element being juxtaposed to the outermost sealing flanges respectively of said annular members, and means for joining and sealing the sealing flanges of each annular member to the adjacent end of said tubular element and to the adjacent sealing flange of said support respectively in order to seal the interior of said rotor from said rotor chamber.

References Cited in the file of this patent

UNITED STATES PATENTS

| | | |
|---|---|---|
| 2,257,065 | Olley | Sept. 23, 1941 |
| 2,297,828 | Flatford | Oct. 6, 1942 |
| 2,301,063 | McConaghy | Nov. 3, 1942 |
| 2,460,418 | Hart | Feb. 1, 1949 |
| 2,463,936 | Allison | Mar. 8, 1949 |
| 2,468,187 | Ericson | Apr. 26, 1949 |
| 2,687,695 | Blom et al. | Aug. 31, 1954 |
| 2,734,459 | Zimsky | Feb. 14, 1956 |

FOREIGN PATENTS

| | | |
|---|---|---|
| 488,444 | Canada | Nov. 25, 1952 |